United States Patent [19]

Bell et al.

[11] 4,285,554
[45] Aug. 25, 1981

[54] SUNVISOR CASSETTE HOLDER

[75] Inventors: Ted A. Bell; Timothy S. Cooksey, both of Coshocton, Ohio

[73] Assignee: Pretty Products, Inc., Coshocton, Ohio

[21] Appl. No.: 140,189

[22] Filed: Apr. 14, 1980

[51] Int. Cl.³ .......................... A47B 81/06; B60R 7/00
[52] U.S. Cl. .......................................... 312/9; 312/10;
   312/12; 211/40; 206/387; 224/312
[58] Field of Search ................. 312/9, 10, 12, 18, 332;
   206/387; 224/311, 312; 211/40

[56] References Cited

U.S. PATENT DOCUMENTS

| | | | |
|---|---|---|---|
| 2,211,879 | 8/1940 | Cane | 224/312 |
| 3,385,643 | 5/1968 | Adell | 206/387 |
| 3,510,008 | 5/1970 | Mason | 206/387 |
| 3,627,398 | 12/1971 | Reese | 206/387 |
| 3,702,132 | 11/1972 | Fites et al. | 206/387 |
| 3,752,551 | 8/1973 | Clark | 206/387 |
| 3,856,192 | 12/1974 | Nelson | 312/10 |
| 4,231,625 | 11/1980 | Perez et al. | 312/10 |

FOREIGN PATENT DOCUMENTS 1503568  3/1978  United Kingdom .................. 312/9

Primary Examiner—Victor N. Sakran
Attorney, Agent, or Firm—Robert E. Stebens

[57] ABSTRACT

A storage holder for tape cassettes is provided for carrying of a plurality of such tapes on an automotive vehicle's sunvisor. The storage holder includes a plurality of compartments for receiving respective ones of the cassettes and each compartment is provided with sets of opposed cassette supporting ribs that are formed and positioned to engage opposite sides of a cassette and provide the sole support therefor. Each compartment is dimensioned to permit end-wise insertion of a cassette with the cassette's tape transport head disposed at either side of the compartment. A cassette clamping plate is provided to mechanically engage the cassette and to hold it against a pair of the supporting ribs. The clamping plate is resiliently biased to provide a clamping force and is provided with a retaining lug for interfitting engagement with a cassette at a reel drive aperture. Spring clips are provided to removably mount the storage holder on a sunvisor.

25 Claims, 10 Drawing Figures

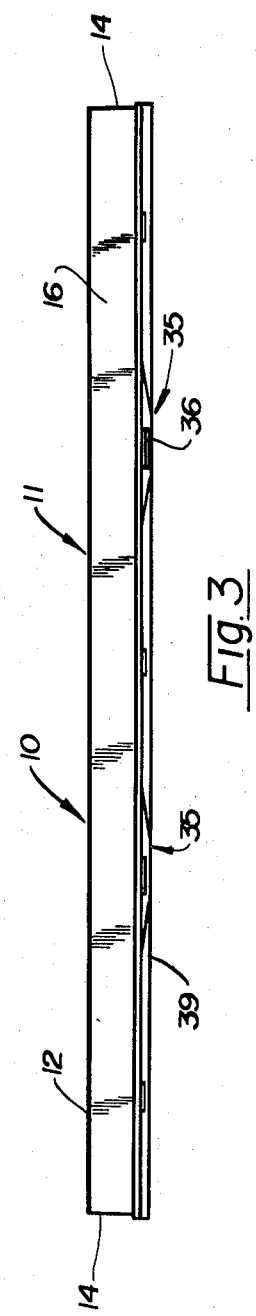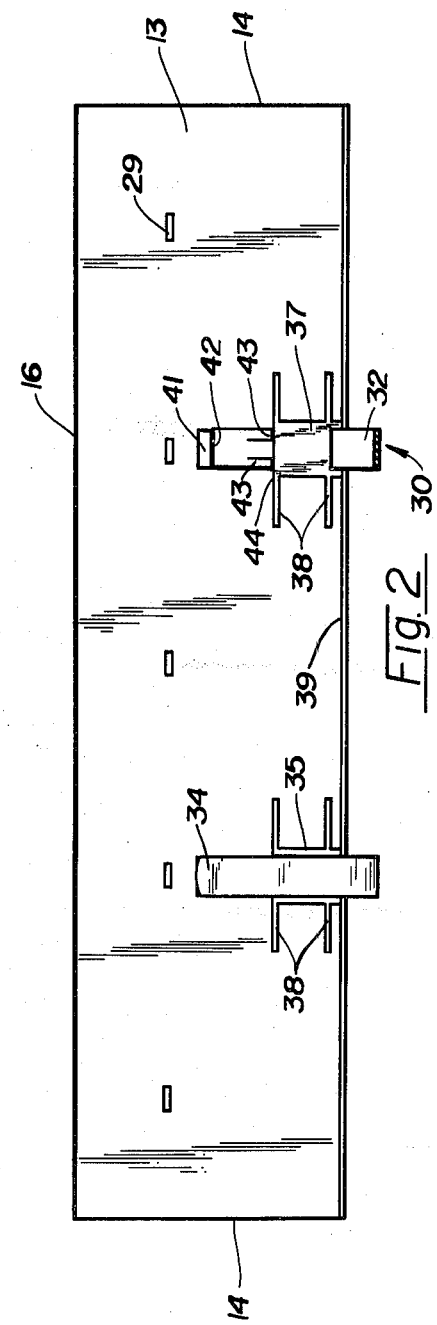

SUNVISOR CASSETTE HOLDER

BACKGROUND OF THE INVENTION

This invention is directed to the providing of a suitable sunvisor cassette holder structure which is designed to be utilized in an automotive vehicle for the storage of cassette tapes. Audio tape decks for installation in automotive vehicles are presently available utilizing either 8-track cartridge units or two-track tape cassettes. Storage or carrying of cassettes in an automotive vehicle has presented a problem in that simply laying the cassettes on the vehicle seat is not practical since the vehicle's movement will strew the sets everywhere. Storage in the glove compartment or map case is not practical because they are then relatively inaccessible to the driver while the vehicle is in operation. Similarly, placing the cassettes in a bulky carrying case tends to make them inaccessible to the driver should he wish to change cassettes while driving. To select and remove a cassette from a portable carrying case necessitates the driver to divert attention from the road in traffic conditions.

Several types of 8-track cartridge holders are known for use. However, their use for the storage of the tape cassettes is less than satisfactory. U.S. Pat. No. 3,385,643 discloses a structure which is designed to receive and store tape cartridges as contrasted to tape cassettes. It does not include separate compartments for each of the cartridges but has respective flanges and ledges incorporated in a multi-unit chamber to define the respective spaces for the several tape cartridges. The structure is also of the type which can only be used in conjunction with tape cartridges which are of a planar wall configuration. A detent 26 is shown in FIG. 1 for securely locking the cartridge in place and to thus reduce the noise from rattling of the cartridge in the storage container. However, this locking mechanism is rendered ineffectural if the cartridge is stored in a reverse position such that the upper left corner of the cartridge 28 is placed where the bottom left corner of the cartridge was positioned.

U.S. Pat. No. 3,856,192 is also directed to a storage cabinet for tape cartridges as contrasted to tape cassettes. The illustrated structure of that patent is comprised of respective compartments provided with cushioning of respective compartments provided with cushioning material around the surfaces thereof for protection of the cartridges and their retention through a frictional gripping action. Since the cartridge must slide in frictional engagement with that resilient material, it is readily seen that this structure would not be adapted to a tape cassette where a substantial extent of the tape is exposed along one longitudinal edge. Additionally, the wall structure of this storage cabinet would not necessarily work with tape cassettes having a non-uniform thickness.

Other tape cartridge holders are known, such as that shown in U.S. Pat. No. 3,510,008 in which a resilient biasing rib projects against a side wall of a tape cartridge thereby forcing the other side wall against the opposite side of the cartridge holder. Such a storage unit would not be desirable with cassettes as it would very likely damage the tape which is exposed along the one longitudinal side unless care was taken to insert the cassette in only one orientation.

SUMMARY OF THE INVENTION

In accordance with this invention, a tape cassette holder is provided for advantageous use in an automotive vehicle by mounting on a sunvisor. The sunvisor cassette holder structure of this invention is formed from a molded plastic case having a plurality of compartments for releasably receiving individual tape cassettes. Each of the compartments is provided with opposed sets of ribs extending longitudinally of the compartment for supporting engagement of the cassette at opposite coplanar walls. Included in the cassette holder is a resilient plate fabricated such that its lower surface interfits with one of the reel drive apertures formed in a body wall of the cassette to securely grip and retain the cassette in the compartment. The resilient plate does not function to prevent the unwinding of the tape from a reel within the cassette body but does function to clamp the cassette against a pair of the support ribs and against a wall surface of the holder structure to prevent movement of a cassette in a compartment. If desired, a flexible finger may be provided to project into the compartment to mechanically engage a cassette to hold the reel with the tape and functions to prevent the tape from moving. This finger may be either rubber or plastic and is flexible enough to be bent over when the cassette is inverted into the holder, yet, returned to an upright position thus projecting into one of the tape reel drive hubs in the cassette unit when the unit is fully inserted into the sunvisor cassette holder and serves to prevent rotation of that reel. The sets of ribs in each compartment are located to engage the coplanar body wall surfaces of the cassette and thus accommodate the tape transport head extending along one longitudinal side of the cassette and thus permit insertion of the cassette with the tape transport head at either side of the compartment.

The cassette holder is mounted on and secured to a sunvisor with attachment clips at either the separate spring metal construction or integral plastic formation, the structure being formed from a plastic material. The metal clips have one leg inserted through a recessed socket integrally formed to the holder structure with the other leg projecting in overlying relationship to a surface of the holder to frictionally grip the sunvisor therebetween. In an alternative form, the clip would be integrally fabricated with the plastic body of the cassette.

The respective compartments for the cassettes are of an elongated configuration designed to receive the cassette in an endwise manner. The compartments are of a size substantially larger in dimension than the tapes with the two sets of ribs extending into the interior of each compartment so as to engage the opposite coplanar walls of the main body portion of the cassette. This design enables the cassettes to be inserted in either of two possible orientations and avoid interference with the relatively larger tape transport head section of the cassette. Removal of the tapes from the apparatus is accomplished by merely pulling on the cassette to extract it from the holder since the resilient plate easily permits the tape's removal when such pressure is applied in a lateral direction. One side wall of each compartment is formed with a slot to facilitate gripping of the cassette for effecting its removal from the compartment.

The primary objective of this invention is to provide a sunvisor cassette holder structure that is of extremely economical construction and is particularly easy to install and maintain in a functional operational relationship in an automotive vehicle. An important aspect of this objective is the providing for the storage of the cassettes on a sunvisor. This function enables the listener of cassette tapes to conveniently store such tapes in a highly accessible location without requiring a bulky cassette carrying cases currently available. Additionally, this apparatus securely holds the cassette tapes while not in use as well as providing for their easy removal when use is desired.

Still another objective of this invention is to provide a sunvisor cassette holder in which the cassettes may easily be stored. An important aspect of this objective is a construction of the compartment such that the cassette tape may be inserted in either of the two possible directions with no interference by the relatively larger tape transport head section of the cassette. Also, the cassettes are not stored in protective boxes and their use is thus facilitated. The holder itself provides the necessary protection.

Another objective of this invention is to provide a sunvisor cassette holder which may be conveniently installed on or removed from the sunvisor of an automotive vehicle with a minimum amount of effort. An important aspect of this objective is the securing of the cassette holder to the sunvisor by means of metallic or plastic clips. Removability of the cassette holder enables the holder to be used as a transporting case. Other attachment means may be utilized such as, for example, the hook and loop tapes commercially sold under the trademark name VELCRO. Also, the sunvisor and holder may be designed and constructed with cooperative interlocking structures.

While one important objective of this invention is to provide a cassette holder designed to be removably secured to a vehicle's sunvisor, it will be understood that the holder may be permanently incorporated into a sunvisor. This would result in loss of portability but the holder would retain all of its other advantageous and novel features.

These and other objects and advantages of this invention will be readily apparent from the following detailed description of an illustrative embodiment thereof. Reference will be had in the accompanying drawings which illustrate the embodiments of the invention.

DESCRIPTION OF THE ILLUSTRATIVE DRAWINGS

FIG. 2 is a bottom plan view thereof.

FIG. 3 is a rear elevational view thereof.

DETAILED DESCRIPTION OF THE ILLUSTRATIVE EMBODIMENTS

Figure 1:
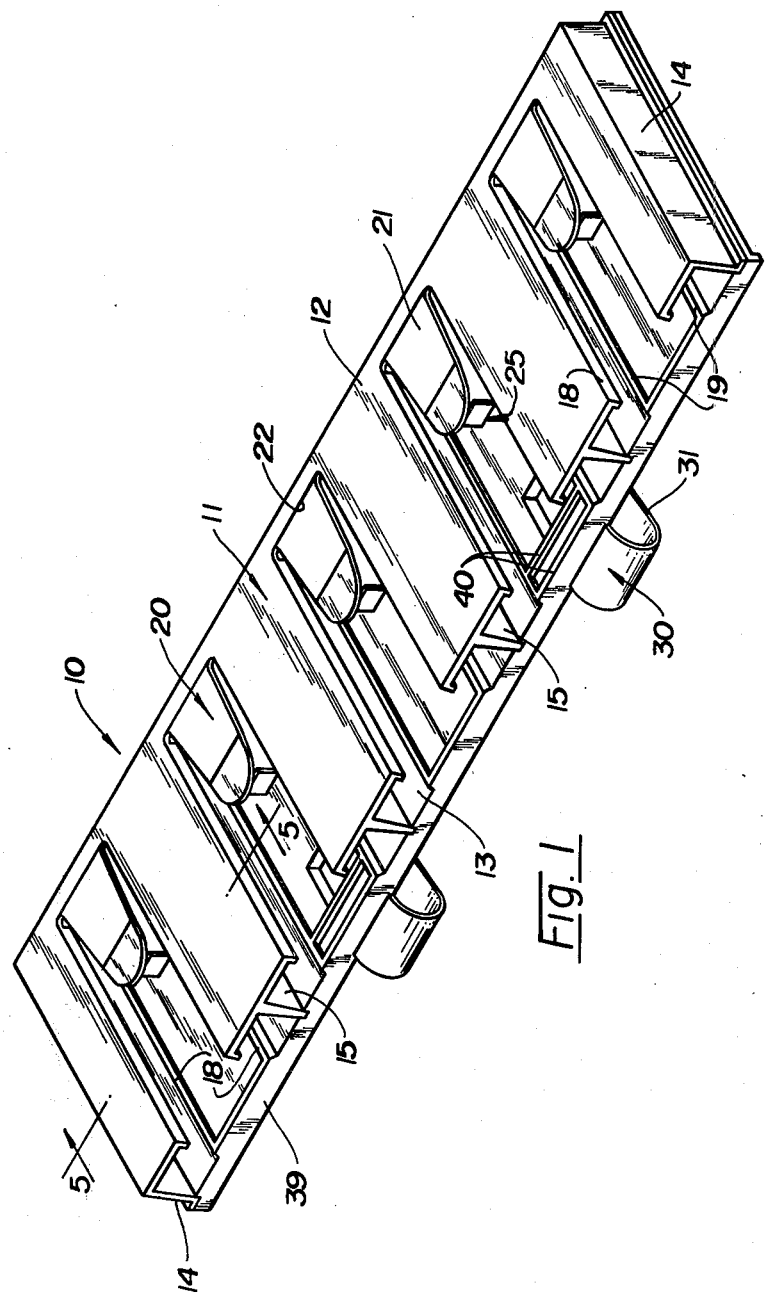
FIG. 1 is a top perspective view of a tape cassette holder for mounting on a vehicle sunvisor embodying this invention.
Figure 4:
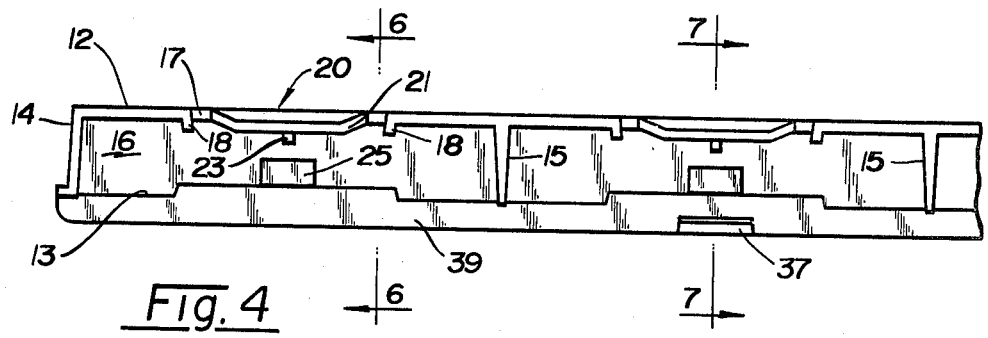
FIG. 4 is a fragmentary front elevational view thereof on an enlarged scale of the left end portion of FIG. 1.

Having reference to the drawings and in particular to FIG. 1 thereof, a storage holder 10 designed to hold a plurality of tape cassettes is shown and is seen to be designed to be carried by the sunvisor of an automotive vehicle. While mounting of the storage holder 10 is not specifically illustrated in FIG. 1, that mounting is illustrated with other figures of the drawing and will be explained in further detail. This exemplary embodiment of the storage holder 10 comprises a structural body 11 that includes a pair of opposed walls 12 and 13 that are disposed in spaced parallel relationship. These two walls 12 and 13 define the sides of the relatively elongated structural body 11 and they are mechanically secured and supported in the desired spaced relationship by a pair of transverse end walls 14 and a plurality of intermediate transverse walls 15. These end walls 14 and intermediate transverse walls 15 define in cooperation with the opposed side walls 12 and 13, a plurality of compartments dimensionally configured to receive respective tape cassettes in the manner as is diagrammatically illustrated in broken lines in FIGS. 5 and 6.

Fabrication of the structural body 11 is economically achieved through molding of the side walls 12 and 13 as separate components and then assembling those components into a unitary structure. Constructural techniques readily lend themselves to the utilization of appropriate plastic compositions which are of a thermoplastic type and when thus formed by the known processing techniques. form a structural body having the necessary structural strength characteristics. Having reference also to FIGS. 5 and 6 will clearly show that the side wall 12 is integrally formed with the end walls 14 and intermediate transverse walls 15 and in addition thereto is integrally formed with a rear wall 16 which extends along one longitudinal side of the structural body at the ends thereof opposite the open ends of those compartments. It will be noted here that the transverse walls 15 have a tapered configuration in cross-section to facilitate removal from the die mold and that the end walls 14 and rear walls 16 are relatively outwardly divergent for the same purpose. The opposite side wall 13 is formed with a peripheral recess extending on each of the ends along the one longitudinal side thereof for interengagement with the flanged terminal ends of the end walls 14 and rear wall 16. Also, the side wall 13 is formed with a plurality of grooves extending transversely and positioned to receive the terminal ends of each of the transverse walls 15. Mechanical securing of the side walls 12 and 13 in assembled relationship can be readily achieved through utilization of selected adhesive compositions appropriate for the particular plastic compositions employed in the fabrication of the components, or, in appropriate instances, the use of ultrasonic welding techniques.

Figure 5:
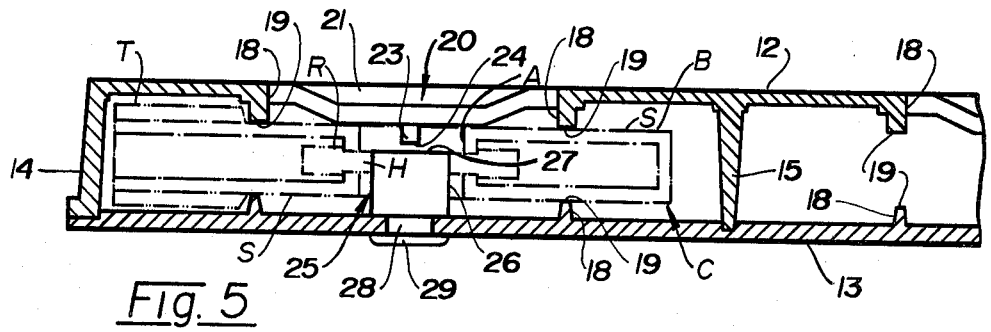
FIG. 5 is a vertical sectional view on an enlarged scale taken along lines 5—5 of FIG. 1 and showing a tape cassette in broken lines inserted into the compartment.
Figure 6:
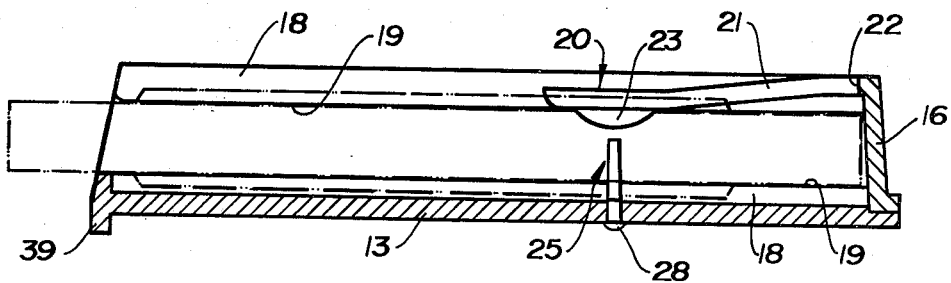
FIG. 6 is a vertical sectional view on an enlarged scale taken along lines 6—6 of FIG. 4 and showing a tape cassette in broken lines inserted into a compartment.
Figure 7:
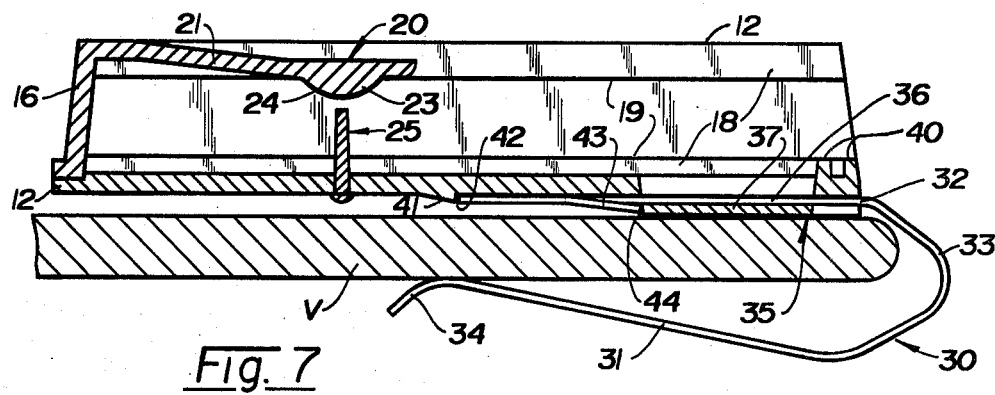
FIG. 7 is a vertical sectional view on an enlarged scale taken along lines 7—7 of FIG. 4 but showing the holder secured on a vehicle sunvisor.

Understanding of the functional operation of the storage holder of this invention will be better understood with reference to FIGS. 5 and 6 for an illustrative description of a typical tape cassette. Such a cassette is shown in broken lines in those figures and is designated by the letter C. Such a tape cassette is of a relatively thin planar type structure having the general dimensions of four inches in length, approximately two and one-half inches in width and having a maximum thickness of the order of one-half inch. Such a cassette also comprises in basic forms, a cassette body B which is formed with coplanar sides S and having a tape transport head T formed along one longitudinal side thereof. The tape transport head T is of a relatively greater thickness than the cassette body B with the head having a thickness of the order of one-half inch and the body a thickness of the order of three-eighths inch. Incorporated in the interior of the cassette body B are a pair of reels R which carry the sound recording tape with that tape being alternately transported from one reel to the other through the tape transport head T. Mechanical driving of the reels R is accomplished through mechanical innerconnection with central reel drive hub H having a toothed or splined inner surface and access to the reel hub being obtained through apertures A formed in each of the respective cassette body sides S. It is the non-uniform thickness of the tape cassettes that provides a problem in effecting the storage of such units. Also, another important factor to consider in the storage is that the tape transport head T is open at the longitudinal side thereof and thus exposes a length of the tape. It is important to avoid mechanical injury to the tape as that would destroy its mechanical drive function and may also impair the retrieval of signals that are magnitically recorded on the tape.

Accordingly, to meet the structural characteristics of the tape cassettes and to also achieve the objectives of providing a holder into which the cassette may be readily inserted, or subsequently withdrawn, the side wall 12 is formed with an elongated slot 17 for each of the compartments that are included therein and each of those compartments provided with a plurality of elongated cassette support ribs 18. The elongated slot 17 is provided to enable one to insert a finger into one of the cassette body apertures A to facilitate gripping of a cassette either for insertion or removal with respect to the compartment. The elongated cassette support ribs 18 are provided to interengage with the coplanar sides S of a tape cassette in the manner as shown in FIGS. 5 and 6 and substantially support the cassette in a centrally disposed position with respect to each of the structural body side walls 12 and 13. It will noted in these figures that the spacing of the side walls 12 and 13 is substantially greater than the thickness of the cassette's tape transport head T so that the interior surfaces of those respective walls will not mechanically interfere with the transport head and its relative sliding movement into and out of the respective compartments. Similarly, the end wall 14 of each of the end-most compartments and the respective intermediate transverse walls 15 are relatively spaced a distance slightly greater than the width of the tape cassette to avoid interference with the movement of the tape cassette.

One of the objectives of the structural configuration of this storage holder 10 is to enable the tape cassette C to be positioned in either of two alternate positions. The transverse width of the structural body 11 is such that it can accommodate the respective cassettes in end-wise disposed relationship in the respective compartments. The relative width of each of those compartments, as defined by the transverse walls or end walls, is substantially greater than the width of the tape cassettes so that with respect to a center line of each compartment, the cassette can be either disposed as is shown in the drawings in broken lines, or can be positioned with the tape transport head T located at the opposite side of the compartment. To further meet this objective, the cassette support ribs 18 are thus located a distance from each of the respective end walls 14 or transverse walls 15 so as to define a transverse space that extends across the structural body 11 to fully accommodate the cassette transport head T. Each of those support ribs 18 is also of a heigth to project into the interior of the compartment and terminating in surfaces 19 that are coplanar, and are parallel to the side walls 12 and 13 and thus define as between opposed sets of support ribs, a space that is substantially equal to the thickness of the tape cassette body B. While the spacing between the support rib surfaces 19 is substantially equal to the thickness of the cassette body B, it will be understood that they will be designed with sufficient clearance to readily permit the sliding movement of the cassette between those ribs, but will be in a position to support the cassette so that the transport head T will not be in interfering contact with any other portions of the structural body. It will also be noted, with reference to FIG. 6, that the support ribs 18 extend across the entire transverse width of the compartments and thus provide full support for each cassette throughout its entire length.

The support ribs 18 integrally formed with the side wall 12 are preferably formed at the edge of each of the respective elongated slots 17. These ribs thus provide additional structural rigidity to the side wall 12 but this is not a factor of concern with respect to the opposite side wall 13. With the providing of the elongated slot 17 to facilitate insertion and removal of the tape cassette C, it is thus necessary that the side wall 12 be provided with two support ribs 18 to obtain a balanced support with respect to the tape cassette. However, the number of ribs provided on the opposite wall 13 may be increased with additional ribs disposed between the two illustrated ribs, or in the absence of any other interfering structural components, a single rib could be provided. It is deemed sufficient to provide the two opposed sets of ribs as these provide adequate support and sufficient stability for maintenance of the tape cassette in the respective compartment.

Securing of the tape cassettes C in respective compartments is achieved by means of a retaining element 20 provided for each such compartment. In this illustrative embodiment, each retaining element 20 includes an elongated clamping plate 21 which is carried by the structural body 11 and is disposed to extend longitudinally through a respective elongated slot 17. Each clamping plate 21 is supported to lie substantially within the plane of the one side wall 12 but is resiliently biased inwardly of the respective compartment so as to mechanically interengage with a tape cassette and thus secure the cassette in a compartment. Advantageously, each clamping plate 21 may be integrally formed with a respective side wall 12 at the one end of the slot 17 and through appropriate selection of the plastic composition utilized in the fabrication of the structural body, and specifically the side wall 12, as the necessary resilient biasing force may be obtained as an inherent feature of the structure with each clamping plate being capable of flexing about its respective juncture line 22 with the side wall 12.

Secure mechanical interengagement between the clamping plate 21 and respective tape cassettes is by a retaining lug 23 which is primarily designed to cooperatively interengage with a cassette body B at the one aperture A formed therein and providing access to the tape reel. That aperture, as is diagrammatically illustrated, is typically formed with inclined side walls and thus the lug 23, which is of a plate-like structure, is provided with an arcuately curved surface 24 to better interfit in the cassette body aperture A. The lug 23 is also disposed in longitudinal alignment with the length of the respective compartment and this arcuately curved surface 24 thus facilitates movement of the cassette with respect to the clamping plate 21.

The length of the clamping plate 21 is such that it projects a distance transversely across the structural body 11 so as to position the retaining lug 23 at a point which is coincident with the region at which the innermost cassette aperture would be located. The transverse width of the structural body 11 is such that the cassette will contact the rear wall 16 when fully inserted in retained relationship in its compartment. Thus, it will be seen that upon insertion of a cassette into a compartment, an end edge of the cassette will engage the arcuately curved surface 24 of the retaining lug 23 and through a relative caming action will cause flexing of the clamping plate 21 in a relatively outward direction. Continued movement of a cassette into a compartment will then result in the retaining lug 23 riding along the outer surface of the cassette body side S and ultimately, when the cassette is fully inserted with the end edge in contacting engagement with the rear wall 16, the retaining lug 23 will then drop into the aperture A as is shown in FIGS. 5 and 6. When thus relatively positioned, the clamping plate 21 through its resilient characteristics exerts an inwardly directed force that effectively clamps the cassette against the surfaces 19 of the opposed support ribs 18 carried by the side wall 13. Also, through proper dimensional spacing of the retaining lug 23 with respect to the rear wall 16, the arcuately curved surface 24 of the lug will tend to force the cassette further into the compartment and effectively clamp the cassette's end edge against the rear wall 14 with that surface contact preventing swinging of the cassette in its own plane across the ribs 18. This clamping force is designed to be sufficient to assure that the cassette will be retained within that compartment and to also assure that the cassette will be retained within the compartment and to also assure that the cassette will be maintained in relatively fixed relationship against the opposed supporting ribs and essentially avoid generation of any noise that could normally be expected to be produced from the vehicle vibrations.

Figure 5A:
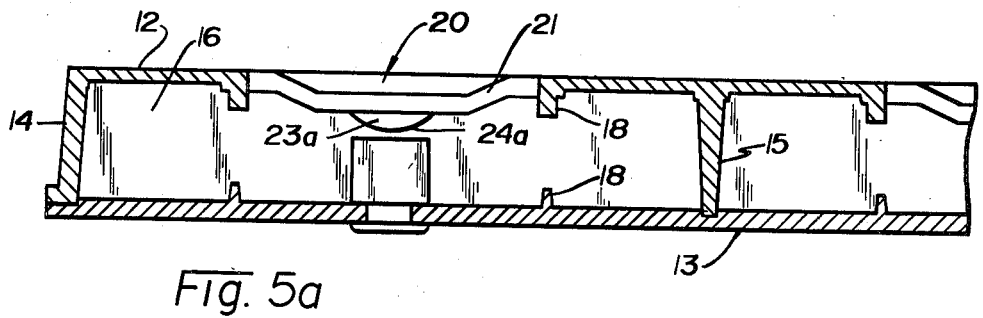
FIG. 5a is a vertical sectional view similar to FIG. 5 showing a modification thereof.

A modified structure is shown in FIG. 5a wherein the modification resides in a configuration of the retaining lug 23a that is carried by the clamping plate 21. The other structural components illustrated in FIG. 5a are essentially the same as that previously described and thus carry the same identifying numerals. In this modification the retaining lug 23a is formed as a segment of a sphere and thus a convexly curved surface 24a. A retaining lug of this configuration provides a degree of increased stability through its ability to also resist displacement of a cassette in a relatively side-wise direction within the compartment.

As an additional feature to enhance the performance of the storage holder in securing the tape cassettes C in fixed relationship, a reel retaining finger 25 is provided in each of the compartments. This reel retaining finger 25 is formed from a relatively resilient material such as rubber or suitable plastic composition and incorporates a flat blade-like configuration. The finger has a width such that it will be capable of insertion into a reel drive hub H with the width thereof resulting in the side edges 26 interfitting in mechanical interengagement with the spline or teeth formed in the interior of the drive hub. As can be seen in FIGS. 5 and 6, this finger has a length such that it projects from the side wall 13 a sufficient distance to enter through the aperture A of the cassette and extend into the region of the reel drive hub H. This length of the finger, however, is such that it does not extend into interfering relationship with respect to the retaining lug 23 with its terminal end edge 27 being normally spaced from the lug. Securing of the reel retaining finger 25 to the side wall 13 is accomplished by means of a mounting post 28 that is of a lesser width than a finger and projects through a suitably dimensioned aperture formed in the side wall 13. An integrally formed cap 29 secures the finger to the wall through its overlying engagement with the exterior surface of the side wall 13. Forming the retaining finger 25 from a resilient material enables the cassette to be readily inserted into the respective compartment. The finger 25 merely bends downwardly during the passage of the cassette body side S thereover and then springs outwardly into the aperture A and the reel drive hub H when the cassette is fully inserted. In this operative relationship the retaining finger 25 will prevent relative rotation of the reel and unwinding of the tape that is retained thereon.

The cassette storage holder 10 of this invention is designed for utilization in automotive vehicles for the convenient storage and carrying of such tape cassettes. Accordingly, the storage holder includes attachment means for securing the structural body 11 to a sunvisor. This mounting and carrying of the holder with respect to a sunvisor is diagrammatically illustrated in FIG. 7 where a sunvisor V is shown disposed in cooperative engagement therewith. A sunvisor has a general planar configuration of predetermined thickness and thus securing of the structural body 11 to that visor can be readily accomplished by means of a pair of spring clips 30. The two spring clips are disposed in relatively spaced relationship longitudinally of the structural body with each being located in coincident relationship with the second compartment from each respective end. The first embodiment of the spring clip 30, forming the attachment means as shown in FIGS. 1-7 comprises a U-shaped spring metal structure having the two elongated legs 31 and 32. The one leg 31 forms a clamping arm while the other leg 32 is mechanically secured to the structural body 11. A curved end portion 33 interconnects the two legs and, with reference to FIG. 7, it will be seen that the leg 31 forming the clamping arm is configured to extend in an inwardly convergent relationship toward the structural body 11. A terminal end portion 34 of the leg 31 is turned outwardly to facilitate passage of the spring clip over the longitudinal end edge of a sunvisor.

Attachment of the spring clip 30 to the structural body 11 is readily accomplished by respective bracket assemblies 35 that are integrally formed with the side wall 13 of that structural body. Each of the bracket assemblies 35 defines a socket 36 which is open at each end and through which the elongated leg 32 may be extended. This socket 36 is conveniently formed as an integral structure of the side wall 13 by means of a plate 37 which is supported at respective transverse side edges in spaced relationship to the exterior surface of the side wall 13. Integral formation of the plate 37 with the side wall is effected by a die mold wherein an aperture is formed in the side wall as a consequence of the mold configuration. Such molding techniques are well known and this forming of the aperture in the side wall is only as a matter of fabrication techniques and not a structural feature. Enhancement of the structural strength of the bracket assembly is achieved through the formation of longitudinally extending ribs 38 since the elongated mounting leg 32 extends parallel to the outer surface of the side wall 13. The longitudinal edge of that wall is preferably formed with an outturned flange 39 that is of a width to coincide with the outermost surface of the plate 37. Consequently, the flange 39 is formed with an aperture through which the mounting leg 32 may project. Additional reinforcement of the structure is obtained through the forming of longitudinally extending ribs in the region of the areas where the spring clips 30 are attached. Preferably, a pair of such ribs 40 are formed on the inwardly facing side of the side wall 13 and closely adjacent to the longitudinal edge at which the compartments open.

Securing of the spring clips 30, so as to prevent their sliding movement with respect to the structural body, is accomplished by a spring locking mechanism. Formed on the outer surface of the side wall 13 is a stop lug 41 which is positioned to interengage with a terminal end 42 of the mounting leg 32. Formed in the mounting leg 32 are a pair of locking clips 43 which are bent out of the plane of that mounting leg. As can be best seen in FIG. 7, those locking clips 43, when the spring clip is assembled with the structural body, will project into locking relationship to an end edge 44 of the bracket assembly 35. The spacing between that end edge 44 and the stop lug 41 is dimensionally related to the relative length of that portion of the leg extending from its terminal end 42 to the operative ends of the locking clips 43 and thus prevents displacement of the spring clip in either direction when thus assembled.

Figure 8:
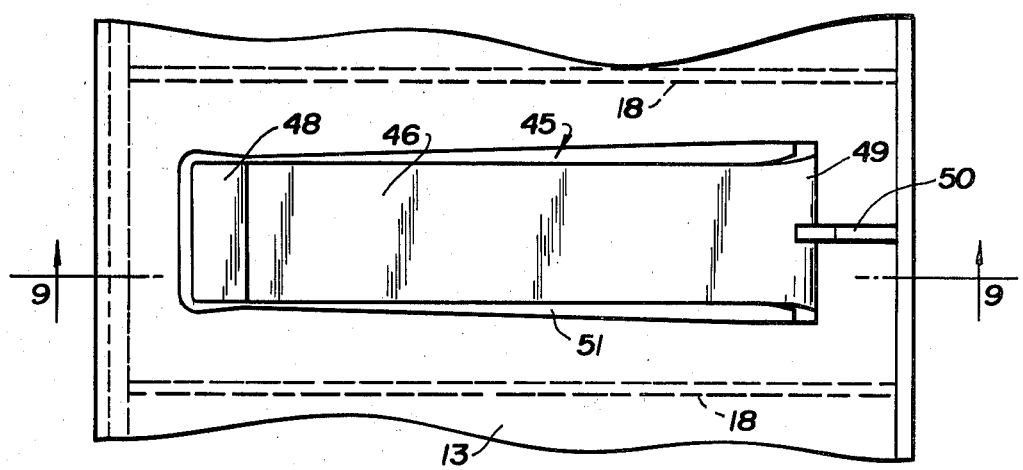
FIG. 8 is a fragmentary bottom plan view on an enlarged scale showing a modified structure having an integrally formed visor attachment clip.
Figure 9:
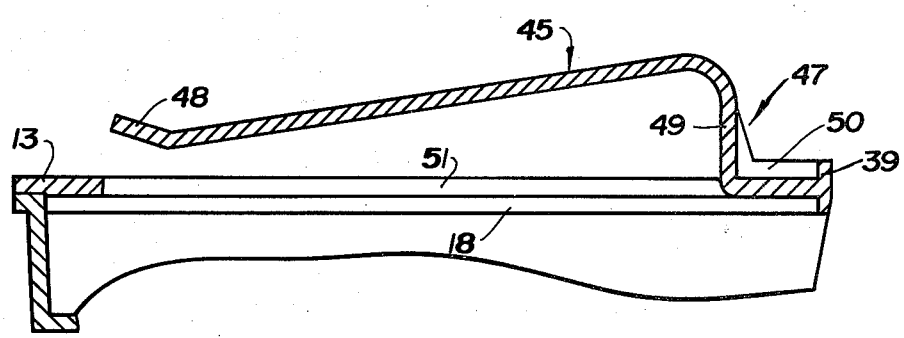
FIG. 9 is a vertical sectional view taken along line 9—9 of FIG. 8.

A modified attachment means for the storage holder is shown in FIGS. 8 and 9. This modified attachment means comprises a formation of a spring clip 45 which is integrally formed with the side wall 13. With such an integral structure, the spring clip thus includes only one elongated leg 46 which performs the clamping function with respect to the sunvisor. This leg 46 is secured at one end by a mounting bracket assembly 47 so as to support the leg in a relatively convergent relationship to the outer surface of a side wall 13. A terminal end portion 48 is turned relatively outward to facilitate sliding of the clip over the sunvisor. The mounting bracket 47 includes an upstanding leg portion 49 and a reinforcing rib 50 to enhance the structural rigidity of the bracket. Integral formation of this spring clip 45 is achieved by forming an elongated aperture 51 in the side wall for passage of the associated components of the die mold that effects formation of the clip. Again, this represents a conventional holding technique that is well known by those familiar with the plastic molding field.

It will be readily apparent from the foregoing detailed description that a particularly useful storage holder is provided for tape cassettes. This storage holder embodies a construction which securely retains tape cassettes in separate compartments for their protection and the entire unit may be readily removed from the vehicle for carrying and storage during the times that it is not being utilized so as to better avoid theft of the relatively expensive tapes. The unique configuration of cassette supporting ribs within each of the compartments enables the cassettes to be positioned in either of two alternate positions and thereby facilitate their insertion into the respective compartments of the holder. The clamping plates operate to securely retain the cassettes within the interior of the compartment and prevent their movement as a consequence of any associated vehicle vibration and consequently, eliminate and avoid generation of other noise. As an optional feature, a resilient finger may be provided to interlock with a tape reel in the cassette and thus prevent unwinding of the tape. While a holder having five cassette compartments is illustrated because that number of tapes is dimensionally proportional to the length of most vehicle sunvisors, it will be understood that a greater or lessor number of compartments may be provided. Also, while portability is considered to be an advantageous attribute of a preferred structure, it is nevertheless a feature that can be eliminated if permanent incorporation of the holder in a sunvisor, or other vehicle structure, such as a center console, is deemed more desirable.

Having thus described this invention, what is claimed is:

1. A storage holder for tape cassettes comprising
a structural body including a pair of sidewalls supported in relatively spaced relationship and defining a plurality of tape-cassette-receiving compartments disposed in side-by-side relationship and an opening for each compartment formed along a longitudinal side of the structural body for passage of tape cassettes into and out of each respective compartment, said side walls provided with a plurality of elongated cassette support ribs extending longitudinally through each of said compartments in substantially perpendicular relationship to the opening thereto with the ribs on opposed walls of each compartment cooperatively defining a space therebetween substantially equal to the thickness of a tape cassette and between which a tape cassette can be slideably displaced during insertion ans withdrawal from a compartment, said ribs projecting a distance from respective ones of said walls to prevent a cassette tape transport head from engaging either of said walls, and
a retaining element for each respective compartment carried by said structural body including a clamping plate resiliently biased from one wall toward the other and disposed to engage with a tape cassette interposed between said ribs and operable to retain a cassette in the respective compartment.

2. A storage holder according to claim 1 wherein each said retaining element is operative to urge a cassette in said compartment against a support rib on the opposite wall to produce frictional interengagement therewith to resist relative sliding displacement therebetween.

3. A storage holder according to claim 2 wherein each said retaining element includes a cassette-engaging lug carried by said clamping plate and projecting in relatively inwardly directed relationship to said walls for mechanical interengagement with a tape cassette inserted in the respective compartment.

4. A storage holder according to claim 3 wherein said cassette-engaging lug is formed with an arcuately curved surface adapted to interfit in an aperture formed in the cassette in association with a tape reel drive hub.

5. A storage holder according to claim 4 wherein said cassette-engaging lug is an elongated rib.

6. A storage holder according to claim 5 wherein the elongated rib of said cassette-engaging lug extends substantially parallel to said support ribs.

7. A storage holder according to claim 4 wherein said arcuately-curved surface is a surface of revolution.

8. A storage holder according to claim 2 wherein said structural body includes a rear wall extending longitudinally along a side thereof opposite the side at which said compartments open, said rear wall disposed to be in contacting engagement with an end edge of a cassette inserted in a compartment and engaged by said retaining element.

9. A storage holder according to claim 8 wherein each said retaining element includes a cassette-engaging lug carried by said clamping plate and projecting in relatively inwardly directed relationship to said side walls for mechanical interengagement with a tape cassette inserted in the respective compartment, said cassette-engaging lugs being formed with an arcuately curved surface adapted to interfit in an aperture formed in the cassette in association with a tape reel drive hub and apply a force tending to displace a cassette into contacting engagement with said rear wall.

10. A storage holder according to claim 1 wherein said clamping plate is relatively elongated and is secured at one end to said structural body for relative swinging movement into and out of a respective compartment.

11. A storage holder according to claim 10 wherein one of said walls is formed with an elongated slot at each of said compartments and each of said clamping plates extends longitudinally through said slot.

12. A storage holder according to claim 11 wherein said clamping plate extends substantially parallel to said support ribs.

13. A storage holder according to claim 11 wherein said elongated slots in said one wall open at the longitudinal side of said structural body at which said compartments open.

14. A storage holder according to claim 13 wherein each said clamping plate is secured at one end to said one side wall and projects in the direction of the open end of the respective compartment.

15. A storage holder according to claim 1 wherein one of said walls is provided with a pair of said cassette support ribs disposed in spaced relationship in each of said compartments, each rib in said pairs of ribs disposed a distance laterally inward with respect to a respective longitudinal side of the compartment to accommodate a cassette's tape transport head therebetween.

16. A storage holder according to claim 15 wherein the other one of said walls is provided with a pair of said cassette support ribs disposed in aligned relationship to the pair of ribs provided on the other of said wall.

17. A storage holder to claim 15 wherein said wall provided with the pair of support ribs is formed with an elongated slot extending longitudinally of each compartment between the respective pair of support ribs and opening at the longitudinal side of said structural body at which said compartments open, said clamping plate secured to said structural body and projecting longitudinally through said slot toward the open end thereof.

18. A storage holder according to claim 1 having a finger carried by one of said walls in each compartment and projectable a distance laterally therefrom toward the opposite wall to enter into a reel drive hub in a cassette disposed in the respective compartment and cooperatively interfit therewith to prevent rotation of the reel.

19. A storage holder according to claim 18 wherein each said finger is of flat, blade-like form disposed transversely to the longitudinal dimension of the compartment and of a width to have its opposite side edges interfit in mechanical interengagement with a reel drive hub, said fingers being formed from a resilient material to permit flexing of the fingers during insertion or withdrawal of a cassette with respect to the compartment.

20. A storage holder according to claim 1 which includes attachment means operative to effect securing of a holder to an automotive sunvisor.

21. A storage holder according to claim 20 wherein said attachment means is a spring clip having a clamping leg extending in overlying relationship to an outer surface of one of said walls and projecting transversely to the longitudinal side of said structural body at which the compartments open.

22. A storage holder according to claim 21 wherein said clamping leg projects in a direction away from the longitudinal side of said structural body at which the compartments open.

23. A storage holder according to claim 21 or 22 have two of said spring clips with said clips being disposed in relatively spaced relationship.

24. A storage according to claim 21 wherein said spring clip is formed as a separate unit having a pair of clamping legs, one of said legs being mechanically secured to said structural body wall.

25. A storage holder according to claim 21 wherein said spring clip is integrally formed with said structural body wall.

* * * * *